F. MACY.
AUTOMOBILE SLED.
APPLICATION FILED JULY 5, 1916.
1,204,807.
Patented Nov. 14, 1916.
2 SHEETS—SHEET 2.
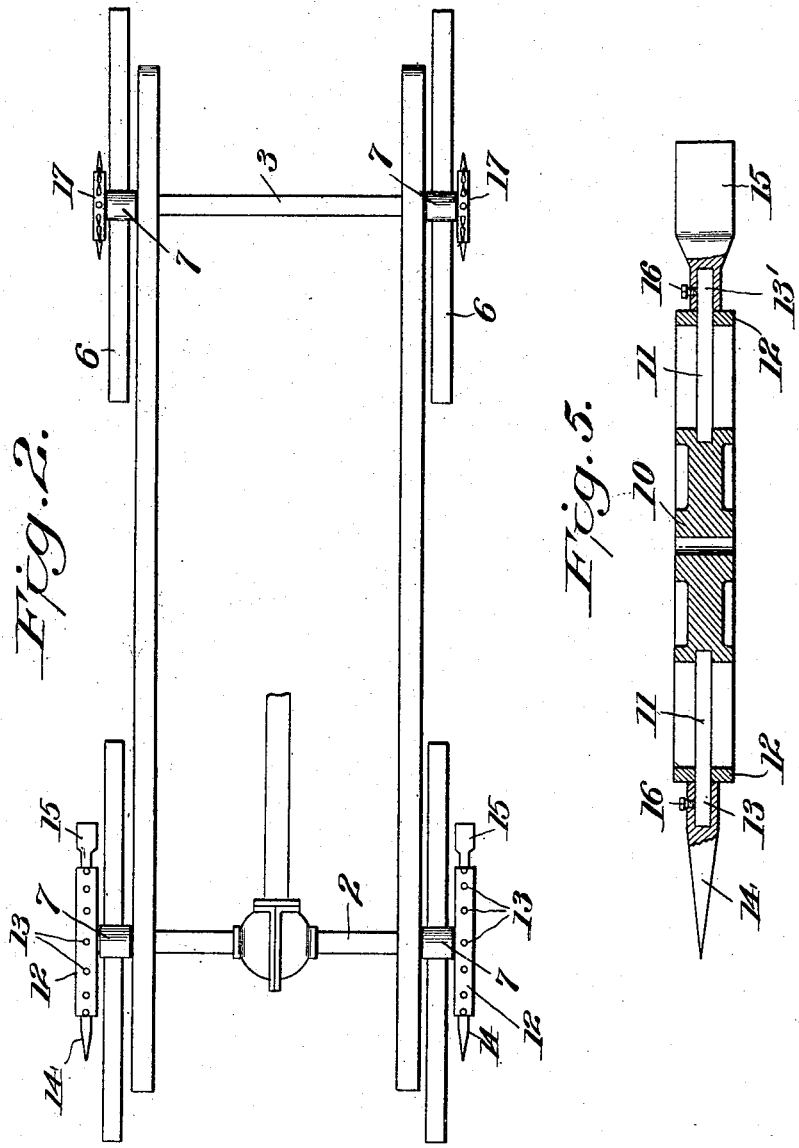
Inventor,
Fred Macy.
By Tracy L. Jeffords
Attorney

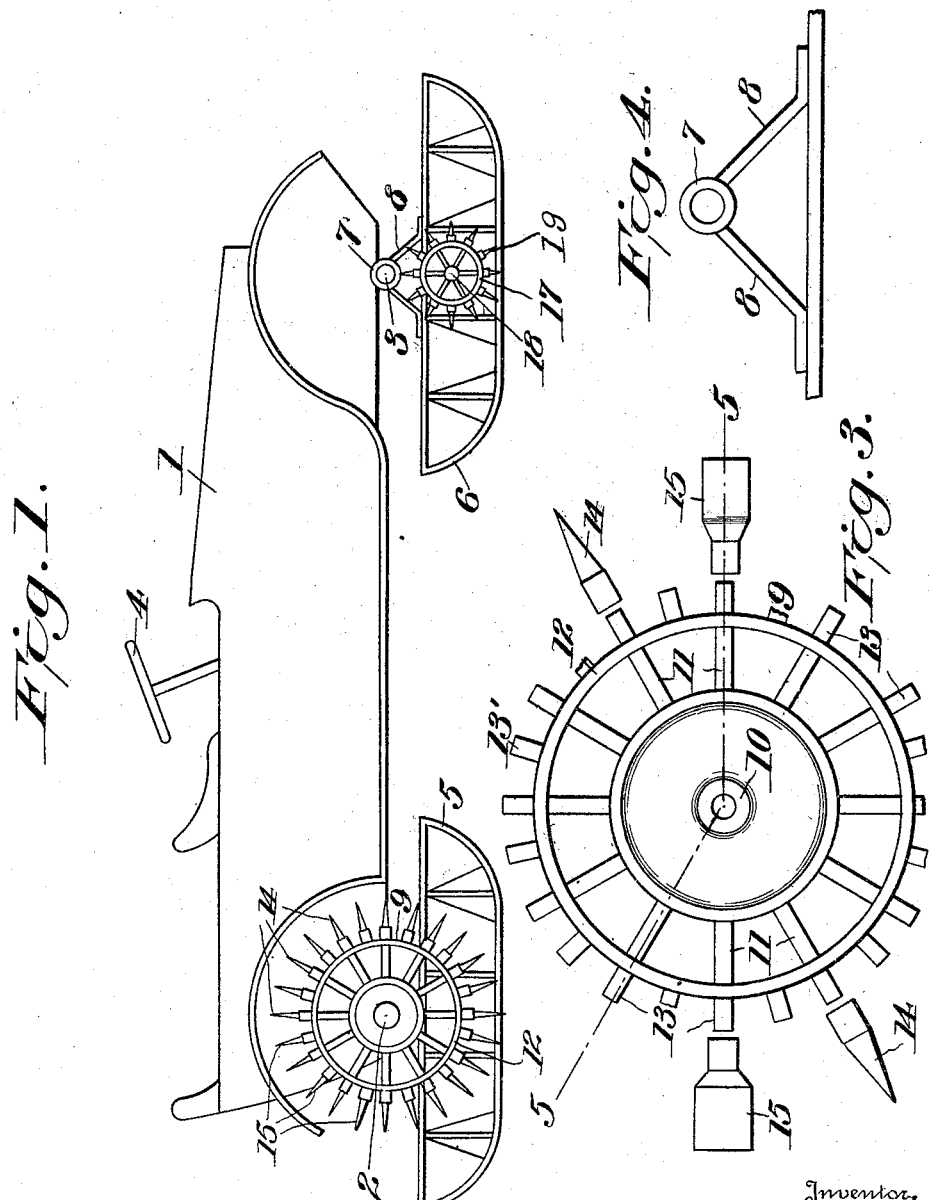

UNITED STATES PATENT OFFICE.

FRED MACY, OF MONTPELIER, VERMONT.

AUTOMOBILE SLED.

1,204,807.  Specification of Letters Patent.  Patented Nov. 14, 1916.

Application filed July 5, 1916. Serial No. 107,603.

*To all whom it may concern:*

Be it known that I, FRED MACY, a citizen of the United States, residing at Montpelier, in the county of Washington, State of Vermont, have invented certain new and useful Improvements in Automobile Sleds, of which the following is a description, reference being had to the accompanying drawings, forming a part thereof.

My invention relates to automobile sleds, that is motor driven vehicles adapted for traveling over snow or ice and the invention has for its object to provide means by which a motor driven vehicle of the usual type may be readily adapted to run safely and effectively over snow or ice, and to move over snow or ice in a backward as well as in a forward direction.

With these and other objects hereinafter described in view my invention consists in the construction and combination of elements hereinafter described and claimed.

Referring to the drawings Figure 1 is a side view of a motor driven vehicle embodying my invention. Fig. 2 is a top plan view of the chassis of the vehicle shown in Fig. 1. Fig. 3 is a side elevation of one of the rear driving wheels with the driving points detached. Fig. 4 is a detail side view of a portion of the front sled and Fig. 5 is a sectional view of one of the rear driving wheels on line 5—5 of Fig. 3.

In the drawings 1 indicates the body of an automobile of ordinary construction having rear axle 2 and front axle 3 and having steering wheel 4 and the usual steering mechanism (not shown) controlled by the steering wheel.

In place of the front and rear wheels with which the automobile is ordinarily provided I provide sleds 5 for the rear axle and 6 for the front axle. These sleds have their runners turned up at front and rear so as to be capable of moving in either direction. The sleds are each provided with a bearing 7 adapted to fit on the end of the axle the bearing being supported from the sled by brace 8.

On each end of the rear axle 2 outside the bearing 7 I secure a driving wheel 9. This driving wheel consists of a hub 10 with spokes 11 radiating from it and extending outward beyond a ring or rim 12 so as to form projecting pins 13 adapted to carry the removable driving points 14. The ring or rim 12 is also provided between adjacent projecting pins 13 with projecting pins 13' which are adapted to carry driving points 15. The driving points 14 are preferably cone shaped so as to terminate in a sharp point while the driving points 15 are chisel shaped so as to give a broad bearing edge in line with the axle. The driving points 14 and 15 are provided with sockets to fit over the projecting pins 13 and 13' and are secured in place by set screws 16.

The front sled 6 is provided below the bearing 7 with stub axles 18 on which are carried spiked wheels 17. These spiked wheels 17 are similar in construction to the driving wheels 9 but are of smaller diameter and the spikes 19 are preferably cone shaped like the points 14. The wheels 17 run idly on their stub axles 18 and are for the purpose of preventing the front sled from skidding in turning corners.

The chisel points 15 on the driving wheels 9 by reason of their breadth give a strong hold on the surface over which the vehicle is being driven and are equally effective whether the vehicle is driven forward or backward and are particularly effective in running over soft snow or other soft surface. These chisel points being removable may be readily taken off for sharpening and replaced after they are sharpened and may be readily replaced by new points when worn. The cone shaped driving points 14 on the driving wheels 9 are adapted to prevent any tendency of the rear wheels to skid in turning corners.

The forward wheels 17 are of course independent of each other.

In order to change an automobile having the usual front and rear wheels into an automobile sled it is only necessary to remove the wheels and to place the bearings 7 of the rear sled on the ends of the rear axle and to secure, to the ends of the axle outside these bearings, the hubs 10 of the driving wheels 9 and to secure the bearings 7 of the front sled on to the stub axles of the front axle the front spiked wheels 17 being in place on the stub axles 18.

Having thus described my invention what I claim is:

An automobile sled comprising a body and front and rear axles, supporting sleds on the front and rear axles, driving wheels carried by the rear axles provided with driving points having chisel shaped ends, and spiked guide wheels carried by the front sled.

This specification signed this 30th day of June A. D. 1916.

FRED MACY.

Copies of this patent may be obtained for five cents each, by addressing the "Commissioner of Patents, Washington, D. C."